United States Patent [19]

Morra

[11] Patent Number: 4,866,437

[45] Date of Patent: Sep. 12, 1989

[54] TRANSFORMER DEVICE FOR THE DETECTION OF VEHICLE ATTITUDE

[75] Inventor: Luigi Morra, Asti, Italy

[73] Assignee: Industrie Riunite S.p.A., Beinasco, Italy

[21] Appl. No.: 144,296

[22] Filed: Jan. 15, 1988

[30] Foreign Application Priority Data

Jan. 16, 1987 [IT] Italy .............................. 20525/87[U]

[51] Int. Cl.⁴ ............................................ G08C 19/08
[52] U.S. Cl. ............................. 340/870.36; 280/707; 188/299; 324/208
[58] Field of Search ....................... 340/870.35, 870.36; 180/290; 280/6.1, 707; 188/299; 324/207, 208; 73/11

[56] References Cited

U.S. PATENT DOCUMENTS

| | | | |
|---|---|---|---|
| 3,626,283 | 12/1971 | James | 340/870.36 |
| 4,468,739 | 8/1984 | Woods et al. | 280/707 |
| 4,722,548 | 2/1988 | Hamilton et al. | 280/707 |
| 4,726,453 | 2/1988 | Obstfelder et al. | 188/299 |
| 4,776,610 | 10/1988 | Moog | 280/707 |

Primary Examiner—Donald J. Yusko
Assistant Examiner—Tyrone Queen
Attorney, Agent, or Firm—Robert P. Seitter

[57] ABSTRACT

A transformer device for the detection of vehicle attitude, comprising a signal sensor, which is arranged inside the cylinder of the shock absorber coaxially with the piston thereof. The sensor cooperates with an amplifier for amplifying the detected signals. The sensor includes a differential transformer comprising a primary AC-fed coil and two secondary coils each having one of their ends electrically connected to the other. The remaining end of each secondary coil is electrically connected to the amplifier to which the output sensor signal is applied to be amplified, before being applied to the output of the device. The signal is a function of the voltage induced voltage in the secondary coils of the differential transformer which is determined by the piston position with respect to the primary coil and secondary coil and thereby the relative positioning of the piston inside the shock absorber cylinder.

3 Claims, 1 Drawing Sheet

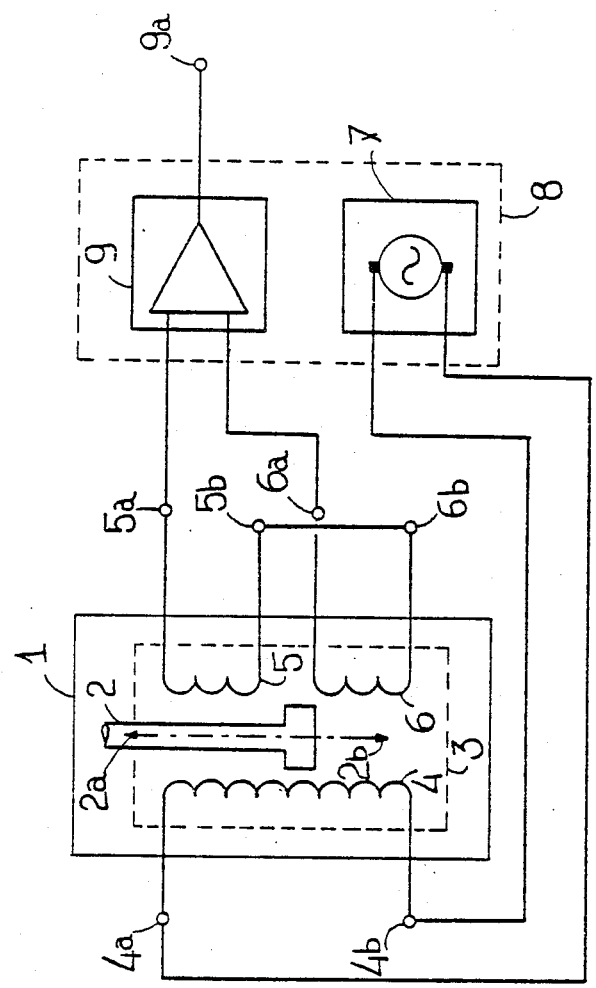

TRANSFORMER DEVICE FOR THE DETECTION OF VEHICLE ATTITUDE

BACKGROUND OF THE INVENTION

The present invention relates to adjusting and controlling electronic equipment for automotive vehicles and, more particularly it refers to a transformer device for the detection of vehicle attitude. The device comprises a signal sensor including a primary coil and two secondary coils, all enclosed inside the vehicle shock absorber and fixed on its working cylinder so as to be coaxial with its piston. The coils cooperate with an amplification means amplifying the signal detected by the sensor.

In the automotive field different detection systems are employed in order to determine the height above ground level of a vehicle. The sensors of these detection systems are usually placed between the vehicle body and the vehicle wheels, or it is pre-assembled in the shock absorber so as to avoid, through this integrated construction, problems of mounting the connections and the final assembly. The sensor employed can be of any known type, but the utilization of electrical windings, such as coils, fixed inside the cylinder of the shock absorber, is more frequently adopted. Depending on the quantity to be measured these windings can be one or more coils associated with the magnet core movement following the change of the piston position inside the shock absorber. By using the described coils with a detector which is based on the induction principle, it is possible to measure the change of the electrical quantities involved in the operation and therefore the relative positions of the piston and cylinder of the shock absorber. However, the measurement carried out by this detector requires subsequent thermal compensations, due to temperature variations during operation. Furthermore, overall dimension problems in housing the coils and the relating detection system have been encountered.

SUMMARY OF THE INVENTION

The object of this invention is to eliminate the above mentioned disadvantages with regard to the detection devices presently used, by providing a transformer device for the detection of the vehicle attitude, which is able to detect the induced voltage in a differential transformer with a lower error index of the detected measurements. That is, a lower error with respect to the correspondence between the measured voltage and the relative position of the piston inside the shock absorber.

These and other objects are achieved according to the present invention by a transformer device for the detection of vehicle attitude, comprising a signal sensor, which is arranged inside the cylinder of the shock absorber so as to be coaxial with the piston thereof and which cooperates with an amplification means for amplifying the detected signals. The sensor includes a differential transformer comprising a primary AC-fed coil and two secondary coils each having one of their ends electrically connected to the other. The remaining end of each secondary coil is electrically connected to the amplification means by which the sensor's output signal is amplified before applying it to the output of the device. The output signal is a function of the voltage induced in the secondary coils of the differential transformer, as determined by the piston mutual position with respect to the primary coil and secondary coil, and is thus a function of the relative positioning of the piston inside the shock absorber cylinder.

BRIEF DESCRIPTION OF THE DRAWING

Further characteristics and advantages of the present invention can be more clearly gathered from the following detailed description of a preferred embodiment of a transformer device for the detection of vehicle attitude with reference to the accompanying drawing in which the single figure is a general block diagram of the device according to the present invention.

DETAILED DESCRIPTION OF THE PREFERRED EMBODIMENT

The reference number 3 generally refers to the group, which is surrounded by a dashed line, representing the sensor, which includes a primary winding 4 and two secondary windings 5 and 6 which together form a differential transformer. An end $5b$ of coil 5 is electrically connected to an end $6b$ of coil 6, while the two other ends $5a$ and $6a$ of the respective coils 5. 6 are electrically connected the inputs of an amplifier 9, which forms an amplification means amplifying the signal transmitted by the sensor 3. Through its ends $4a$, $4b$, the primary coil 4 is connected to an AC voltage generator which, together with amplifier 9, is located in an electronic control unit 8, which is surrounded by a dashed line. The output signal of amplifier 9 is then applied to the output $9a$ of the device in accordance with the present invention. The electronic control unit B is physically separated from sensor group 3, but is electrically connected thereto.

Note that the sensor 3 is mounted in a shock absorber shown schematically to include a housing 1 and a piston 2. As seen in the drawing the piston 2 moves in either direction, $2a$ or $2b$, in its housing 1 and is encompassed by and coaxial with the coils 4, 5 and 6.

The operation of the device according to the present invention is described as follows:

When the flux produced inside the primary induction coil 4 intercepts the piston 2 of the shock absorber 1 acting as a ferromagnetic material core, a voltage signal variation across the ends $5a$, $6a$ of secondary coils 5, 6 takes place for the transformer effect. Since coils 4, 5 and 6 function as differential transformer windings, it is possible to induce on the secondary, namely the coils 5, 6, the effects determined by the magnetic circuit characteristic variations. The voltage variation induced by the primary winding, coil 4, on the secondary windings, coils 5, 6, allows evaluation of the shifting of the piston inside the shock absorber I. After such an evaluation processing of the detected signal is carried out by amplifying it through amplifier 9.

The voltage is supplied to the final stage $9a$ of the device of the present invention and will provide a definitive signal which is temperature-compensated for sake of safety and which represents, in any case, a true correspondence between its value and the relative position of the piston 2 inside the shock absorber 1.

It will now be appreciated by those skilled in the art that by coupling the amplification means 9 to the sensor group 3 and employing the differential transformer principle, a more reliable detection measurement is obtained, because there is realized a more rigid correspondence between parametric changes of the circuit described and those of position of the piston 2 inside the shock absorber 3. In addition, in this wave, particular mechanical calibrations are not required. It will also be appreciated that several structural and parametrical modifications and variations can be made to the device of the present invention, all falling within the scope of the appended claims.

What is claimed is:

1. A transformer device for the detection of vehicle attitude, comprising a signal inside a cylinder of a shock absorber which is coaxially arranged with a piston thereof, said signal sensor cooperating with an amplification means for amplifying signals generated by said sensor, said sensor including a differential transformer comprising a primary AC-fed coil and two secondary coils, each of said secondary coils having one of their ends electrically connected to the other, while a remaining end of each of said secondary coils is electrically connected to said amplification means to provide an amplified sensor output signal, said output signal being a function of a voltage induced in the secondary coils of the differential transformer as determined by a positioning of the piston with respect to the primary coil and secondary coils and thereby by a relative positioning of the piston inside the shock absorber cylinder.

2. The transformer device for the detection of vehicle attitude according to claim 1 wherein said amplification means consists of an electronic amplifier.

3. The transformer device for the detection of vehicle attitude as claimed in claim 1, including a source of AC signals applied across said primary AC-fed coil.

* * * * *